United States Patent [19]

Liehr

[11] Patent Number: 5,627,257
[45] Date of Patent: May 6, 1997

[54] PROCESS FOR THE PRODUCTION OF POLYAMIDES ON THE BASIS OF $\alpha,\omega$-DINITRILES

[75] Inventor: Hartmut Liehr, Frankfurt am Main, Germany

[73] Assignee: Zimmer Aktiengesellschaft, Germany

[21] Appl. No.: 600,116

[22] Filed: Feb. 12, 1996

Related U.S. Application Data

[63] Continuation-in-part of Ser. No. 333,270, Nov. 2, 1994, abandoned.

[30] Foreign Application Priority Data

May 27, 1994 [DE] Germany .................. 44 18 540.5

[51] Int. Cl.$^6$ ............................................. C08G 69/28
[52] U.S. Cl. .................. 528/335; 528/313; 528/319; 528/324; 528/331; 528/336; 528/339
[58] Field of Search .................. 528/313, 319, 528/324, 331, 335, 336, 339

[56] References Cited

U.S. PATENT DOCUMENTS

| | | | |
|---|---|---|---|
| 4,725,666 | 2/1988 | Curatolo et al. | 528/336 |
| 4,739,035 | 4/1988 | Shyu et al. | 528/335 |
| 5,306,804 | 4/1994 | Liehr et al. | 528/335 |

*Primary Examiner*—James J. Seidleck
*Assistant Examiner*—P. Hampton-Hightower
*Attorney, Agent, or Firm*—Banner & Witcoff, Ltd.

[57] ABSTRACT

Process for synthesis of spinnable polyamide from $\alpha,\omega$-alkyldinitriles and $\alpha,\omega$-alkyldiamines and excess water, where a) the aqueous solution of the dinitrile is mixed with a catalytic amount of at least one oxygen-containing acid of phosphorus and/or a water-soluble salt of calcium, zinc, cadmium or manganese in the absence of the diamine, and the pH of this solution is adjusted to an initial value in the range of 2.0 to 4.0 before hydrolysis by adding a saturated aliphatic or aromatic dicarboxylic acid and the dinitrile is and the amide-containing precursors derived therefrom are hydrolyzed to dicarboxylic acid at an elevated temperature under autogenous pressure, whereby the hydrolysis is controlled by conductometric determination of the hydrolysate, and b) at least an equimolar amount of diamine is added to the solution from step a) and the mixture is subjected to polycondensation to form polyamide [nylon].

7 Claims, No Drawings

5,627,257

PROCESS FOR THE PRODUCTION OF POLYAMIDES ON THE BASIS OF α,ω-DINITRILES

This application is a continuation-in-part of application Ser. No. 08/333,270 filed Nov. 2, 1994 now abandoned.

BACKGROUND OF THE INVENTION

The present invention concerns a process for multi-stage production of polyamides from α,ω-dinitriles and α,ω-diamines in the presence of water and a phosphorus-oxygen compound as the catalyst plus a co-catalyst. This invention especially concerns the production of nylon-6,6 that can be processed to yield high-grade fibers from adiponitrile and hexamethylenediamine.

THE PRIOR ART

Polyamides of the nylon-6,6 type are produced commercially from a dicarboxylic acid and a diamine, such as adipic acid and hexamethylenediamine. Hexamethylenediamine is obtained by hydrogenation of adiponitrile which can in turn be obtained inexpensively from propylene or acrylonitrile. Adipic acid is synthesized in a multi-stage, cost-intensive process by oxidation of aromatics, because the hydrolysis of adiponitrile with concentrated strong mineral acids to yield adipic acid (British patent no. 1,240,410) is associated with too many problems.

As an economically more advantageous alternative, it has already been proposed that adiponitrile be reacted directly with hexamethylenediamine in the presence of water and a catalyst such as a phosphorus-oxygen compound in a combined hydrolysis-polycondensation reaction to yield nylon-6,6 (U.S. Pat. Nos. 4,436,898, 4,490,521 and 4,749,776).

It is allegedly possible to accelerate the hydrolysis stage by using an additional co-catalyst such as a copper compound (U.S. Pat. No. 4,725,666) or molybdenum compounds (U.S. Pat. No. 4,542,205). It is also known that compounds of ruthenium, rhodium, osmium, nickel (Chemical Abstracts 108 (14) 113198-n regarding JP 61-205221 A) or boron (U.S. Pat. No. 4,603,192) can be used as co-catalysts. Low-molecular nylon-6,6 is also obtained by a noncatalytic reaction in aqueous phase hexamethylenediamine with a mixture of adiponitrile and, for example, 10 mol % adipic acid (Chemical Abstracts 108 (14) 109090-d regarding JP 58-173129 A). All these processes use the aliphatic diamines as reactants in the basic hydrolysis of the dinitrile, which takes place satisfactorily due to the greater basicity of the diamines in comparison with ammonia (by-product). The serious disadvantage of this process, however, is that the diamines and especially hexamethylenediamine undergo partial dimerization under the required reaction conditions of hydrolysis (temperatures of about 260° C., pressure more than 20 bar) and the long dwell times of at least 180 minutes, and the resulting ω,ω-diaminodihexylamine (triamine) acts as crosslinking agent of the molecule chains and the resulting gel content has a considerable negative effect on the quality of the polymer. The concentration of triamines in these polymer products is so great that proper spinning and drawing of the filaments cannot be assured or can be assured only to a limited extent owing to breaks and knots. This is also the reason why these processes have not yet been successful on a large scale industrially.

In order to minimize these side reactions as much as possible, there has already been a proposal for gradually adding the hexamethylenediamine dissolved in water together with a catalytic phosphorus-oxygen compound to the hot aqueous adiponitrile solution (U.S. Pat. No. 4,520,190) or to perform the hydrolysis of adiponitrile in the presence of at most 10% of the required hexamethylenediamine and only add most of the diamine when substantially all the dinitrile has reacted with water at the start of polycondensation (U.S. Pat. No. 4,739,035). During hydrolysis adiponitrile is first hydrolyzed to adipomonoamide-mononitrile, which in turn is hydrolyzed to adipodiamide. The diamide is then hydrolyzed to adipic acid-monoamide, which in turn is finally hydrolyzed to adipic acid. This means that when substantially all the dinitrile has reacted with water and the diamine is added, the reaction mixture consists of these amide-containing precursors together with a small amount of adipic acid. However, the amide-containing precursors have a retarding affect on the polycondensation and result in discoloration of polyamide and in a relatively high triamine content—namely, more than 1000 ppm, based on polyamide, despite the absence of hexamethylenediamine in the hydrolysis stage. (Examples 1, 2 and 16).

SUMMARY OF THE INVENTION

The object of the present invention is to modify the known processes for synthesis of polyamides based on dinitriles in such a way that the above-mentioned disadvantages do not occur or occur only to a slight extent. In particular, spinnable nylon-6,6 that is largely free of triamine is to be synthesized economically from adiponitrile, hexamethylenediamine and excess water in the presence of a catalytic system that has the effect of shortening the time required for the overall reaction and does not interfere with further processing.

It has surprisingly been found that the hydrolysis of the dinitrile, that is necessary at first to synthesize the polyamides, will take place almost completely "to dicarboxylic acid and essentially no precursors" in the absence of the diamine in a weakly acidic medium in the presence of a catalyst system of at least one oxygen-containing acid of phosphorus and/or at least one water-soluble calcium, zinc, manganese or cadmium salt. At least one saturated aliphatic or aromatic dicarboxylic acid that can later be incorporated into the polyamide chain can be used to adjust the weakly acidic medium according to an initial pH in the range of 2.0 to 4.0 before starting the hydrolysis. The required amount is 10 to 1000 mmol acid per mol of dinitrile. The hydrolysis is continued after almost all the dinitrile has reacted with water, until at least 85%, preferably at least 95%, of the hydrolysis products are dicarboxylic acid and at most 15%, preferably at most 5%, amide-containing precursors, whereby the amount is controlled by conductometric determination. Only then is the diamine added and the polycondensation started.

DETAILED DESCRIPTION

The process according to this invention permits a two-stage continuous or discontinuous synthesis of polyamides from α,ω-alkyldinitriles and α,ω-alkyldiamines and excess water, where the alkyl groups of the dinitrile and those of the diamine may be the same or different and each have 2 to 12 carbons with a linear chain or a slightly branched chain. Examples of suitable monomers include especially the dinitriles of succinic acid, glutaric acid, adipic acid, suberic acid, sebacic acid and decanedicarboxylic acid as well as the diamines tetramethylenediamine, hexamethylenediamine, octamethylenediamine, decamethylenediamine and dodecamethylenediamine, optionally in mixture with small amounts of methylpentamethylenediamine or di- or trimethylhexamethylenediamine.

The dicarboxylic acids used to establish a weakly acidic medium before starting the hydrolysis are identical to the dicarboxylic acid that forms the basis for the dinitrile used in the process or, if co-polyamides are desired, these dicarboxylic acids may be different from the dinitrile dicarboxylic acid. Examples include isophthalic acid and terephthalic acid. Preferred monomers include adiponitrile and hexamethylenediamine when the pH is adjusted with adipic acid or terephthalic acid. The diamine is used in at least equimolar amount, preferably 1.001 to 1.15 mol diamine per mol adiponitrile in the case of hexamethylenediamine.

Examples of phosphorus acids that have a catalytic action include phosphoric acid ($H_3PO_4$), hypophosphorous acid ($H_3PO_2$) and preferably phosphorous acid ($H_3PO_3$).

The second catalytic component may be selected from all the water-soluble salts of calcium, zinc, manganese or cadmium, preferably calcium hypophosphite or manganese hypophosphite. The amount to be used is 0 to 50 mmol, preferably 5 to 15 mmol phosphorus acid and 0 to 20 mmol, preferably 1 to 5 mmol salt, each based on 1 mol dinitrile, where at least one of the two catalytic components must be present. No other inorganic acids, such as sulfuric acid or hydrochloric acid, should be added.

The mixture of dinitrile, the two catalyst components, a sufficient amount of the dicarboxylic acid and excess water, preferably 4.5 to 6.0 mol water per mol dinitrile, is heated under autogenous pressure at a temperature of more than 200° C. while stirring, essentially in the absence of oxygen (less than 10 ppm $O_2$) until the dinitrile is almost completely hydrolyzed—in other words, more than 99% hydrolyzed—to dicarboxylic acid and essentially no amide-containing precursors. In the case of adiponitrile, the temperature is in the range of 220°–240° C. according to an autogenous pressure of more than 20 bar (abs.). The degree of hydrolysis can be controlled by means of a conductivity measurement of ammonium dicarboxylate. Ammonium dicarboxylate, which is formed by reaction of the final hydrolysis product, the dicarboxylic acid, with the by-product, ammonia, is the sole product in the reaction mixture which is electrically conductive. The amide-containing precursors or their aqueous solution have no electric conductivity. The increase of the electric conductivity of the reaction mixture is, therefore, a direct measure of the degree of conversion to dicarboxylic acid. The conductivity is measured at the start and at the end of the hydrolysis step and the difference of the two values calculated. The conductivity in each case is determined at 70° C. on samples of the reaction mixture adjusted to a concentration of 20 wt. % of all reaction products in demineralized water. The hydrolysis is continued until an increase in conductivity of at least about 14.8 mS (milli-Siemens), preferably at least about 16.6 mS, is achieved. This corresponds to at least about 85%, preferably at least about 95%, dicarboxylic acid in the hydrolysis products.

Then the hydrolysis mixture is combined with at least an equimolar amount of diamine in the form of finely divided solids or as an aqueous solution and polycondensation is initiated. Since triamine is formed to a greater extent at high temperatures, the hydrolysis mixture is preferably cooled to a lower temperature before adding the diamine. In the case of hexamethylenediamine which tends to react to form dihexamethylenetriamine to a greater extent at temperatures above 190° C., the hydrolysis mixture is cooled to a temperature in the range of 165° to 180° C., preferably 170° to 175° C.

The polycondensation takes place in a known way, whereby the ammonia and water that are formed are expelled first at an elevated pressure and at increasing temperatures, and then condensation is continued with a gradual release of pressure until spinnable polyamide is obtained. Starting with hydrolyzed adiponitrile and hexamethylenediamine, ammonia and water are expelled within 90 minutes, preferably within a maximum of 60 minutes, with high heat, first at a pressure in the range of 9 to 16 bar (abs.), preferably 10 to 15 bar (abs.) at a rising temperature of at most 275° C., preferably at a maximum temperature of 270° C. Then the pressure is reduced to atmospheric pressure or less within 15 to 30 minutes while maintaining the temperature, and finally condensation is continued within 15 to 60 minutes at a temperature of up to 290° C. until obtaining spinnable nylon-6,6 corresponding to a relative viscosity in the range of 2.2 to 3.0 (measured at 25° C. on a solution of 1 g polyamide in 100 ml 96% sulfuric acid).

The resulting nylon-6,6 is characterized especially by the following properties:

relative viscosity of at least 2.2, preferably at least 2.4 (measured at 25° C. on a 1% polyamide solution in 96% sulfuric acid), a neutral color, corresponding to a whiteness (according to ASTM E-313) of at least 60 and a yellowness (according to ASTM D-1925) of less than 10, a small amount of degradation products such as carbonyl and imino compounds, corresponding to a UV transmittance of more than 90% (measured on a 2 wt % polyamide solution in distilled formic acid at 320 nm with a layer thickness of 5.0 cm), a low triamine content of less than 600 ppm (determined by HPLC analysis of the polyamide hydrolysate), good spinnability, corresponding to less than 3 thread breaks in 24 hours during spinning and drawing.

SPECIFIC EXAMPLES

Example 1

487 g adiponitrile 73 g adipic acid 405 g water 5 g phosphorous acid ($H_3PO_3$)

1.8 g calcium hypophosphite ($Ca(H_2PO_2)_2 \cdot H_2O$)

These ingredients are combined and heated in a 3-liter pressurized reactor with a heating jacket while stirring after first inertizing the contents repeatedly with nitrogen. At an autogenous pressure of 25 bar, the reaction mixture is kept at 230° C. for 300 minutes. A sample of the reaction mixture is taken before starting heating and again after these 300 minutes, and after adjusting the concentration of the reaction products to 20 wt. % the electric conductivity is determined at 70° C. The increase in conductivity amounts to 16.6 mS, corresponding to a conversion to adipic acid of about 95%. Then the hydrolysate is cooled to a temperature of 175° C. and an approx. 75% solution of 588 g hexamethylenediamine in distilled water is added by means of a piston pump while the pressure rises back up to 25 bar. After reducing the pressure to 10 bar (gauge) and regulating this pressure, the ammonia and water condensation by-products are expelled by operating the heating system at full power (4 kW). A product temperature of 270° C. is reached within 40 minutes in this way.

At this temperature, the polyamide melt is decompressed within 20 minutes. After 20 minutes more, the polyamide which has been condensed to a relative viscosity of 2.5 ($\eta_{rel}$) is spun. An end group analysis of the polyamide yields —$NH_2$ 50, —COOH 75, —$CONH_2$ 11. The melting point is 261° C. and the triamine content is 500 ppm.

Example 2

513 g adiponitrile 42 g terephthalic acid 430 g water 1.8 g zinc sulfate 3.2 g calcium hypophosphite ($Ca(H_2PO_2)_2 \cdot H_2O$)

These ingredients are combined and heated in a 3-liter pressurized reactor with a heating jacket while stirring after first repeatedly inertizing the contents with nitrogen. At an autogenous pressure of 25 bar, the reaction mixture has a dwell time of 240 minutes at 230° C., after which the increase in conductivity amounts to 14.8 mS (corresponding to 85% adipic acid). Then the hydrolysate is cooled to a temperature of 175° C. and an approx. 75% solution of 588 g hexamethylenediamine in distilled water is added by piston pump. During this process, the pressure rises back up to 25 bar. After reducing the pressure to 10 bar (gauge) and regulating this pressure, the ammonia and water condensation by-products are expelled by operating the heating system at full power (4 kW). Within 40 minutes, a product temperature of 270° C. is reached. At this temperature the polyamide melt is decompressed within 20 minutes. After 20 minutes more, the polyamide, which has been condensed to a relative viscosity of 2.5 ($\eta_{rel}$), is spun out. An end group analysis of the polyamide yields: —$NH_2$ 75, —COOH 85, —$CONH_2$ 9. The melting point is 264° C. and the triamine content is 600 ppm.

Example 3

1070 g adiponitrile 16.6 g terephthalic acid 970 g water 6.0 g manganese hypophosphite, $Mn(H_2PO_2)_2$ 7.4 g hypophosphorous acid, $H_3PO_2$ 2.3 g phosphorous acid, $H_3PO_3$ These ingredients are combined and heated in a 6-liter pressurized reactor equipped with a heating jacket while stirring after first inertizing the contents repeatedly with nitrogen. At an autogenous pressure of 25 bar, the reaction mixture has a dwell time of 300 minutes at 228° C., after which the increase in conductivity amounts to 16.6 mS (corresponding to 95% adipic acid). Then the hydrolysate is cooled to a temperature of 175° C. while the pressure is reduced to less than 10 bar (gauge) and an approx. 75% solution of 1182 g hexamethylenediamine in distilled water is fed into the reactor with a diaphragm pump. During this process, the pressure rises to 25 bar again. After reducing the pressure to 10 bar (gauge), ammonia and water are expelled after starting up the heating system and the stirrer at this pressure. After reaching a product temperature of 260° C., the contents of the reactor are decompressed to atmospheric pressure within 30 minutes. After 20 minutes more, the nylon-6,6 which has been condensed to a relative viscosity of 2.6 ($\eta_{rel}$), is spun out. An end group analysis of the polyamide yields: —$NH_2$ 65, —COOH 70, —$CONH_2$ 12. The melting point is 262° C. and the triamine content is 560 ppm.

I claim:

1. A process for the synthesis of spinnable polyamide (nylon) from $\alpha$, $\omega$-($C_{2-12}$-alkyl)dinitriles and $\alpha$, $\omega$-($C_{2-12}$-alkyl)diamines and excess water, comprising a) mixing an aqueous solution of said dinitrile with a catalytic amount of at least one oxygen-containing acid of phosphorus and/or at least one water-soluble salt of calcium, zinc, manganese, or cadmium in the absence of the diamine, adjusting the pH of this solution to an initial value in the range of 2.0 to 4.0 before hydrolysis by adding a sufficient amount of at least one saturated aliphatic or aromatic dicarboxylic acid and hydrolyzing the dinitrile and the amide-containing precursors derived therefrom almost completely to dicarboxylic acid at a temperature of at least 200° C. under autogenous pressure, wherein the hydrolysis is continued until at least 85% of the hydrolysis product is dicarboxylic acid.

b) reacting the dicarboxylic acid solution from step a) with at least an equimolar amount of diamine, expelling the resulting ammonia and water at an elevated pressure and at a rising temperature, and then polycondensing the mixture to yield spinnable nylon while gradually releasing the pressure.

2. Process according to claim 1, characterized in that 0 to 50 mmol of the oxygen-containing acid of phosphorus and 0 to 20 mmol of the salt of calcium, zinc, cadmium or manganese (where at least one of these components must be present) is used as the catalyst per mol of dinitrile, and 10 to 1000 mmol dicarboxylic acid are added to adjust the pH.

3. Process according to claims 1 or 2, characterized in that the aqueous solution contains 4.5 to 6.0 mol water per mol dinitrile in step a).

4. Process according to claim 1, characterized in that the dicarboxylic acid used to adjust the pH is chemically the same as the dicarboxylic acid obtained by hydrolysis in step a).

5. Process according to claim 1, characterized in that the dicarboxylic acid used to adjust the pH is chemically different from the dicarboxylic acid obtained by hydrolysis in step a) and also serves as a comonomer in synthesis of the polyamide.

6. Process according to claim 1, characterized in that the dinitrile is adiponitrile and the diamine is hexamethylenediamine.

7. Process according to claim 6, characterized in that step a) is carried out at a temperature in the range of 220° to 240° C. and at an autogenous pressure of more than 20 bar, and in step b) the solution is first cooled to a temperature in the range of 165° to 180° C., then mixed with 1.001 to 1.15 mol hexamethylenediamine per mol adiponitrile, maintained for a maximum of 90 minutes at a temperature that rises to no more than 275° C. at a pressure in the range of 9 to 16 bar (abs.), reducing the pressure to atmospheric pressure or less within 15 to 30 minutes while maintaining the same temperature and finally continuing the polycondensation to yield spinnable polyamide within 15 to 60 minutes at a maximum temperature of 290° C.

* * * * *